(12) United States Patent
Henninger

(10) Patent No.: US 7,161,776 B2
(45) Date of Patent: Jan. 9, 2007

(54) METHOD FOR MONITORING A POWER OUTPUT STAGE

(75) Inventor: Michael Henninger, Kelkheim (DE)

(73) Assignee: Siemens Aktiengesellschaft, München (DE)

( * ) Notice: Subject to any disclaimer, the term of this patent is extended or adjusted under 35 U.S.C. 154(b) by 235 days.

(21) Appl. No.: 10/844,990

(22) Filed: May 13, 2004

(65) Prior Publication Data
US 2004/0263295 A1 Dec. 30, 2004

(30) Foreign Application Priority Data
May 16, 2003 (DE) ................................ 103 22 195

(51) Int. Cl.
*H02H 7/00* (2006.01)
*H02H 9/00* (2006.01)
*G01R 31/02* (2006.01)
*G01R 31/327* (2006.01)
*G01R 31/26* (2006.01)
*H02M 7/217* (2006.01)

(52) U.S. Cl. ..................... 361/18; 324/415; 324/421; 324/768; 324/769; 363/127

(58) Field of Classification Search .................. 361/18; 324/421, 415, 768–769; 363/127
See application file for complete search history.

(56) References Cited

U.S. PATENT DOCUMENTS 5,933,341 A 8/1999 Kuriyama et al.
6,297,661 B1 * 10/2001 Chen et al. .................. 324/769
6,661,192 B1 * 12/2003 Copeland ..................... 318/439
6,847,532 B1 * 1/2005 Villaret ......................... 363/132
2003/0067795 A1 * 4/2003 Dubhashi .................... 363/127
2004/0257017 A1 12/2004 Bay et al.

FOREIGN PATENT DOCUMENTS

DE 39 37 447 A1 5/1991
DE 103 20 926 A1 12/2004

* cited by examiner

*Primary Examiner*—Brian Sircus
*Assistant Examiner*—Dharti H. Patel
(74) *Attorney, Agent, or Firm*—Cohen, Pontani, Lieberman & Pavane

(57) ABSTRACT

A method for monitoring a power output stage including at least one half bridge with upper and lower semiconductor switches connected in series, wherein the semiconductor switches are controllable alternately to a switched-on state and a switched-off state by pulse-width modulated pulses, includes measuring a first voltage across the lower semiconductor switch when the upper semiconductor switch is switched on and measuring a second voltage across the lower semiconductor switch when the lower semiconductor switch is switched on, comparing a difference between the operating voltage and the first voltage to a predetermined voltage and comparing the second voltage with the predetermined voltage, which is the maximum permissible voltage across a semiconductor switch when it is switched on, and determining that the power output stage or the output of the at least one half bridge is faulty when at least one of the difference and the second voltage is greater than the predetermined voltage.

8 Claims, 3 Drawing Sheets

METHOD FOR MONITORING A POWER OUTPUT STAGE

BACKGROUND OF THE INVENTION

1. Field of the Invention

The present invention relates to a method for monitoring a power output stage having at least one half bridge which is formed from an upper and a lower semiconductor switch connected in series and to which an operating voltage is applied, wherein the upper and lower semiconductor switches are controllable alternately to a switched-on state and a switched-off state by pulse-width modulated pulses, and wherein a junction point between the upper and lower semiconductor switches in the at least one half bridge forms an output.

2. Description of the Related Art

Power output stages which are fitted with semiconductor switches are used, inter alia, in motor vehicles for driving loads such as, for example, DC motors. When safety-relevant functions are performed by the power output stages and the motors, it is particularly important to check the power output stages for correct operation of the semiconductor switches, for short-circuits, and for overloading.

SUMMARY OF THE INVENTION

It is an object of the present invention to provide a method for monitoring a power output stage having at least one half bridge with upper and lower semiconductor switches for correct operation of the semiconductor switches, for short-circuits, and for overloading.

The object of the present invention is achieved by a method including the steps of measuring a first voltage across the lower semiconductor switch of the at least one half bridge when the upper semiconductor switch is switched on and measuring a second voltage across the lower semiconductor switch of the at least one half bridge when the lower semiconductor switch is switched on. The difference between the operating voltage and the first measured voltage is compared to a predetermined voltage, which is the maximum permissible voltage across a semiconductor switch when it is switched on. The second measured voltage is also compared with the predetermined voltage. The power output stage or its output circuit is identified as being faulty when at least one of the difference and the second voltage is greater than the predetermined voltage. In another embodiment, the power output stage or its output circuit is identified as faulty when both the difference and the second voltage are greater than the predetermined voltage.

The method according to the present invention allows the power output stage to be checked during normal operation. The method according to the invention also allows the steps of measurement of the voltages, determination of the difference between the measured voltages and the input voltage, and comparison of the voltages to a predetermined value to be performed in conjunction with control devices which produce pulse-width modulated pulses, in a simple manner using analog/digital converters and suitable programs, or hardware, which is connected downstream of the analog/digital converter, for evaluation.

The voltages may, in each case, be measured in a central region of the switched-on intervals. This avoids incorrect measurements resulting from transient processes that take place on the edges of the pulses.

The method according to the present invention may be performed on power output stages with one or more half bridges. If the power output stage comprises at least two half bridges, the first voltage across the lower semiconductor switch is measured at a first time when all of the upper semiconductor switches are switched on, and the second voltage is measured at a second time when all of the lower semiconductor switches are switched on.

The method according to the invention may be performed such that the first time and the second time are within the same period of the pulses. However, if, by way of example, it would be better for signal processing reasons, it is also possible to provide for the second time to be in a different period of the pulses to the first time.

In many applications of the method according to the present invention, the predetermined voltage may be set such that it is fixed, or else may be chosen to be the same for all the semiconductor switches. However, it is also possible within the scope of the present invention for the voltage for the semiconductor switches or individual groups of semiconductor switches to be predetermined individually. Since the switched-on resistance R_DSon of the semiconductor switches and thus also the voltage which is dropped across the semiconductor switch for a given current are temperature-dependent, the predetermined voltage may be controlled as a function of the temperature of the semiconductor switches.

To prevent destruction or further damage, the method according to the present invention may provide for the power output stage to be switched off when the power output stage or its output circuit is identified as being faulty. However, other reactions are also possible, such as a warning signal or the inputting of the event to a maintenance memory.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 3 is a schematic diagram of a B6 bridge circuit during the interval in which the upper semiconductor switches are switched on; and FIG. 4 is a schematic diagram of the bridge circuit of FIG. 3 during the interval in which the lower semiconductor switches are switched on.

DETAILED DESCRIPTION OF THE PRESENTLY PREFERRED EMBODIMENTS

Figure 1:
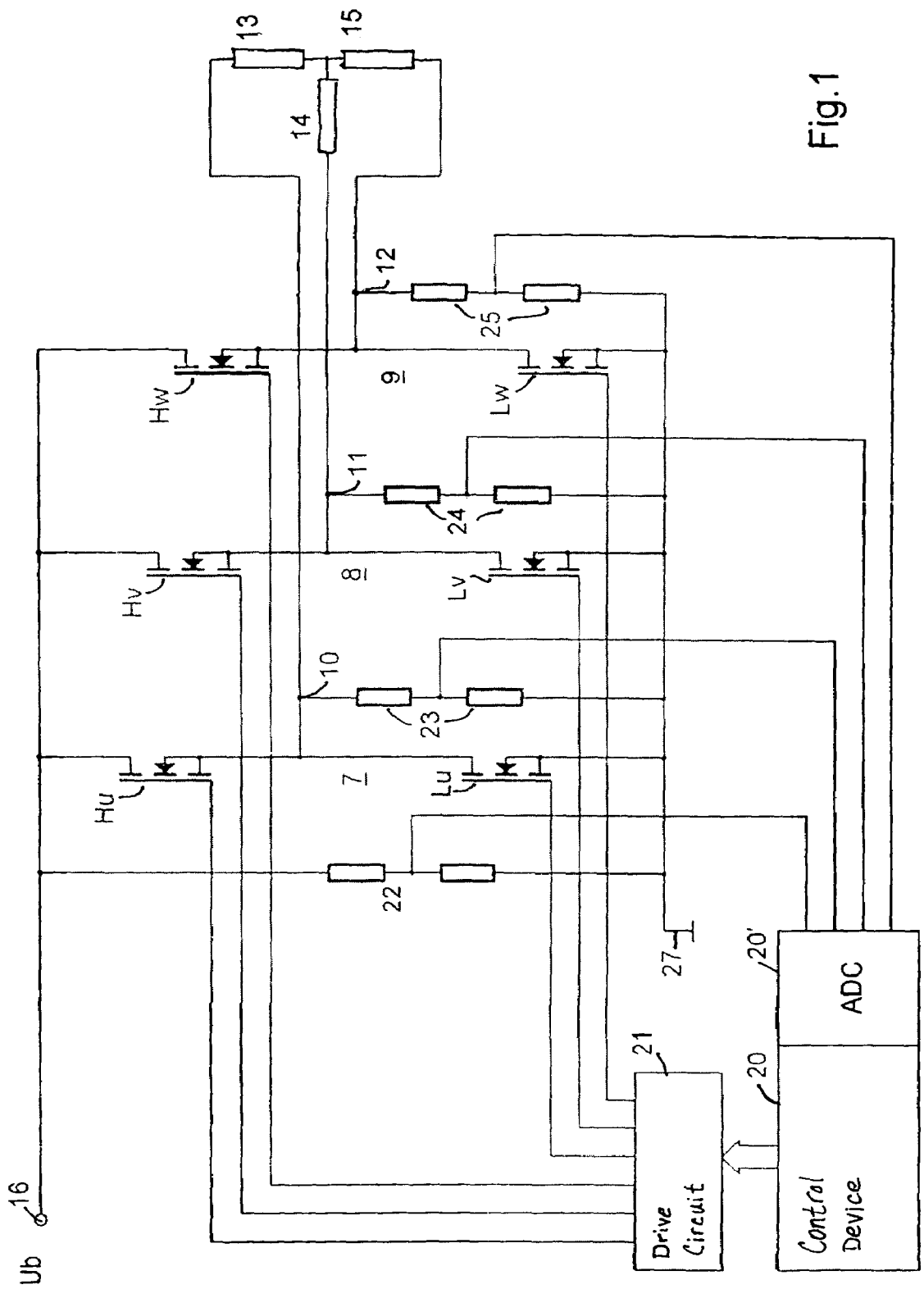
FIG. 1 is a schematic circuit diagram of a power output stage arrangement for carrying out the method according to the present invention.

FIG. 1 shows an exemplary bridge circuit having three half bridges 7, 8, 9. Each of the half bridge circuits 7, 8, 9 includes two MOSFETs Hu, Lu; Hv, Lv; Hw, Lw, respectively, with outputs 10, 11, 12 to which a respective one of the windings 13, 14, 15 (which are in the form of a star circuit) of a brushless synchronous motor with permanent-magnet excitation is connected. An operating voltage Ub is supplied to an input 16.

The arrangement in FIG. 1 also includes a control device 20 which, as known as such in conjunction with power output stages, is formed by a microcomputer or a digital signal processor and does not need to be explained in any more detail as such for understanding of the invention. Outputs of the control device 20 are connected to a drive circuit 21, which produces control signals for the MOSFETs Hu to Lw. The control device 20 is also connected to analog/digital converters 20', whose inputs can be supplied with voltages which are in each case produced by a voltage divider 22, 23, 24, 25. The voltage dividers have considerably higher resistances than the windings 13, 14, 15, to prevent the efficiency of the output stage from being worse in operation. The voltage dividers 22 to 25 are designed such that the maximum permissible input voltage of the analog/digital converter is not exceeded when the operating voltage Ub is at its maximum possible value.

Figure 2A:
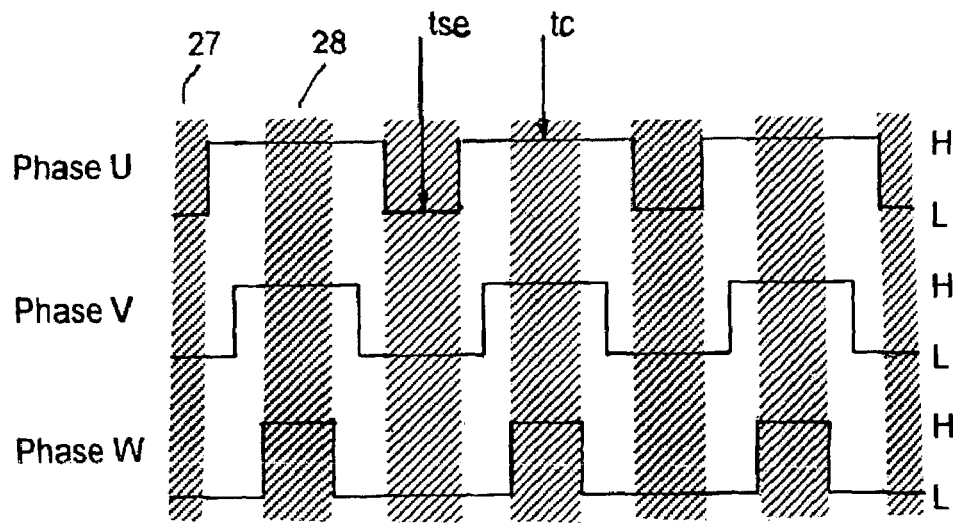
FIG. 2a is a time diagram of voltages showing different pulses for driving the circuit in the exemplary embodiment shown in FIG. 1.
Figure 2B:
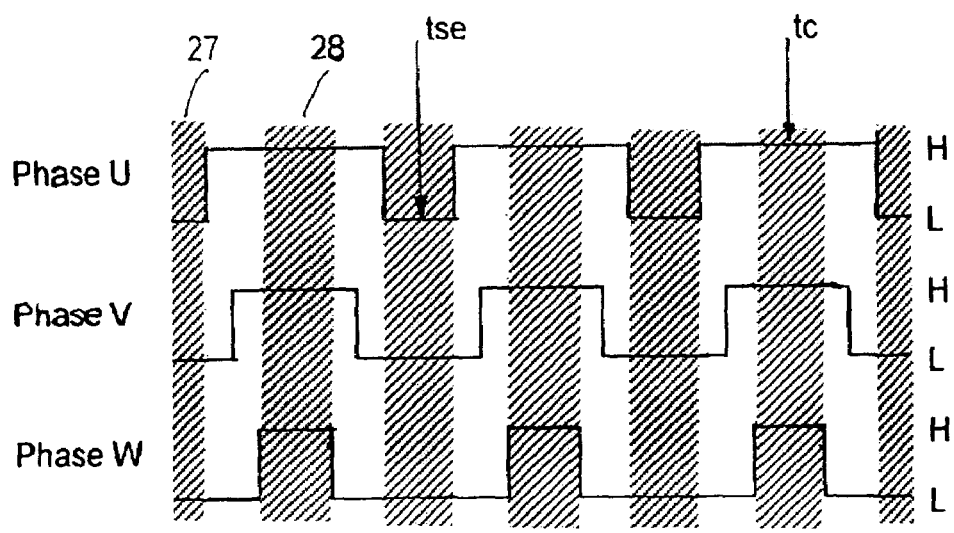
FIG. 2b is another time diagram of voltages showing different pulses for driving the circuit in the exemplary embodiment shown in FIG. 1.

FIGS. 2a and 2b show the drive voltages for the semiconductor switches which form the three phases U, V, W, such that the upper semiconductor switch is in each case switched on at a level H, while the lower semiconductor switch is switched to the switched-on stage at a level L. Three periods are shown in each case, whose duration which is, for example, 50 μs (which corresponds to a frequency of 20 kHz). Since this frequency is considerably higher than that of the rotating field, the width modulation which forms the rotating field cannot be seen in FIG. 2. To this extent, FIG. 2 shows an instantaneous record, in which the interval of the level H in the phase U is at a maximum and that in the phase W is at a minimum, while the interval of the level L in the phase U is at a minimum and that in the phase W is at a maximum.

Figure 3:
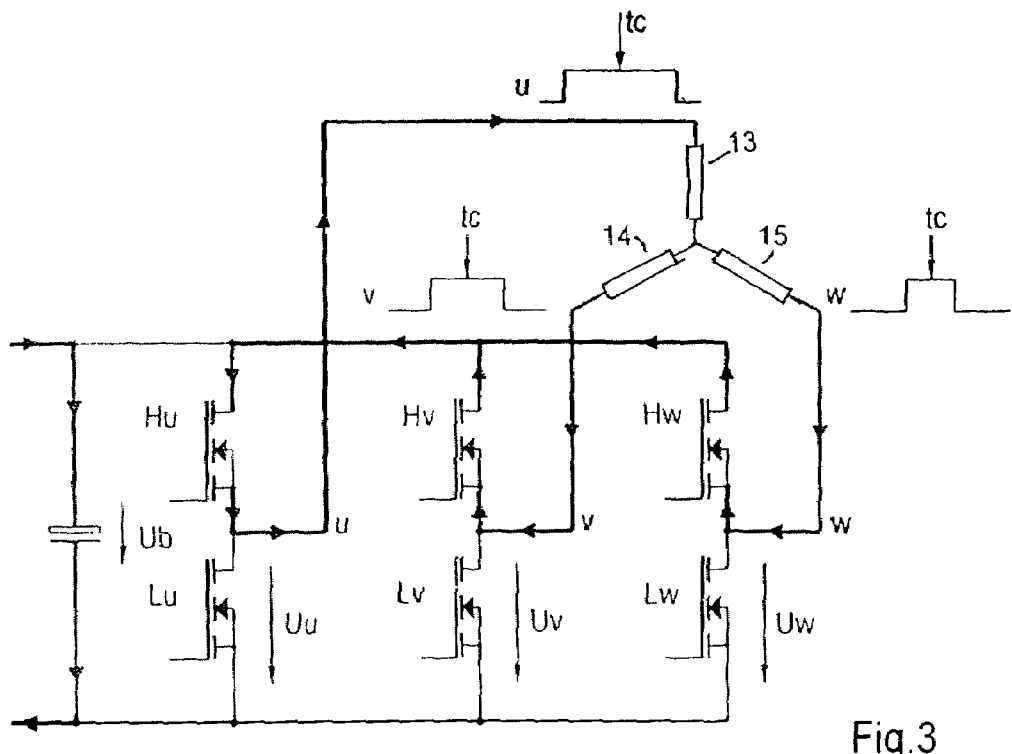

The shaded area 27 represents time periods in which all of the lower semiconductor switches are switched on (see also FIG. 4) and the shaded areas 28 represent time periods in which all of the upper semiconductor switches are switched on (see also FIG. 3). The measurements are carried out at the times $t_{se}$ and $t_c$ that are shown in FIGS. 2a and 2b, specifically at the start and end, respectively, and in the center of a period. The exemplary embodiments which are illustrated in FIGS. 2a and 2b differ in that the time $t_c$ in the case of FIG. 2a is in the same period as time $t_{se}$, while in the case of FIG. 2b, $t_c$ is in the period following the period in which $t_{se}$ was measured.

FIG. 3 shows the state of the power output stage while the upper semiconductor switches Hu, Hv and Hw are switched on. Those conductors in which current flows are shown in bold. The current direction is indicated by arrows. No operating voltage is applied to the windings during the illustrated time period. The current flows as a result of the magnetic energy that is stored in the windings. The voltages Uu, Uv and Uw as well as the operating voltage Ub are measured at $t_c$.

Figure 4:
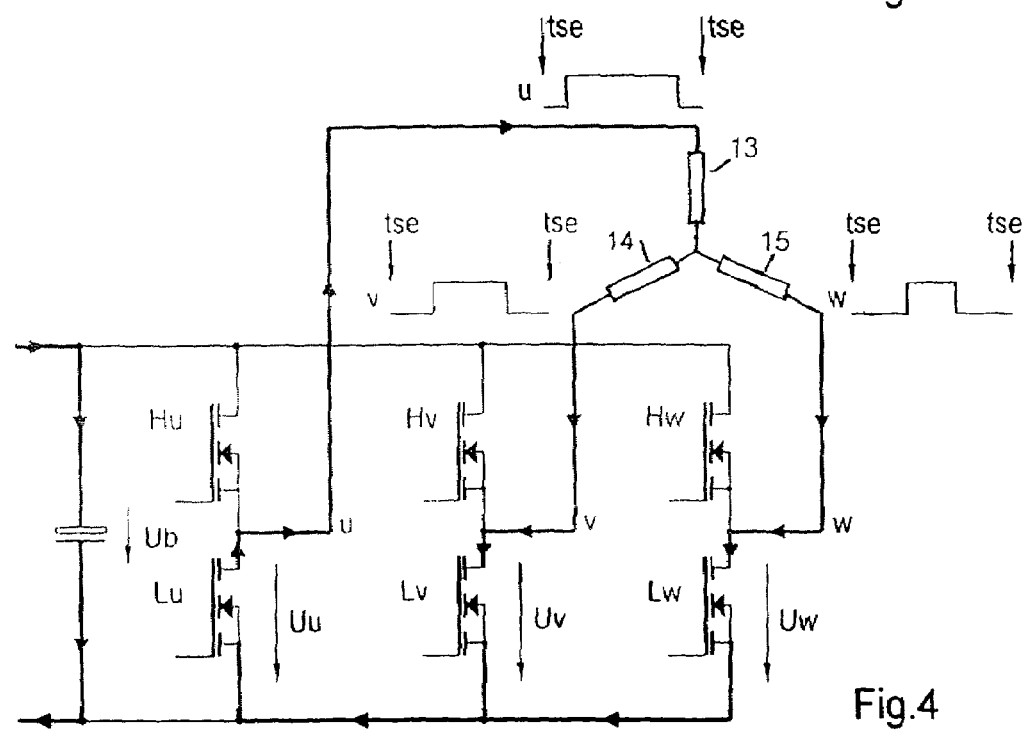

FIG. 4 shows currents and voltages when the lower semiconductor switches Lu, Lv and Lw are switched on. Uu, Uv and Uw are measured at the time $t_{se}$ during this period.

The following assessments are then carried out in the controller 20 (see FIG. 1), to be precise for the measurements at the time $t_c$:

$$Ub-Uu(tc)<U\_DSmax$$

$$Ub-Uv(tc)<U\_DSmax$$

$$Ub-Uw(tc)<U\_DSmax$$

and at the time tse:

$$Uu(tse)<U\_DSmax$$

$$Uv(tse)<U\_DSmax$$

$$Uw(tse)<U\_Dsmax.$$

If one of the differences or one of the measured voltages reaches or exceeds the predetermined voltage U_DSmax then the controller considers a fault is present. If one of the semiconductor switches represents a short circuit or, for example, if a motor supply line is shorted to ground or to the operating voltage, an unacceptably high current flows, which produces an increased voltage drop across the corresponding semiconductor switch. This information is used for fault identification and for switching off the power output stage.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a power output stage including at least one half bridge with upper and lower semiconductor switches connected in series and to which an operating voltage is applied, the semiconductor switches being alternately controllable to a switched-on state and a switched-off state by pulse-width modulated pulses, and wherein a junction point between the upper and lower semiconductor switches in the at least one half bridge form an output, the method comprising the steps of:

measuring a first measured voltage across the lower semiconductor switch when the upper semiconductor switch is switched on and measuring a second measured voltage across the lower semiconductor switch when the lower semiconductor switch is switched on;

comparing a difference between the operating voltage and the first measured voltage with a predetermined voltage and comparing the second measured voltage with the predetermined voltage which is the maximum permissible voltage across a semiconductor switch when it is switched on; and identifying one of the power output stage and the output of the at least one half bridge as faulty when at least one of the difference and the second measured voltage is each greater than the predetermined voltage.

2. The method of claim 1, wherein the steps of measuring the first measured voltage and second measured voltage comprise measuring in a central region of respective switched-on intervals.

3. The method of claim 1, wherein the power output stage comprises at least two half bridges, the first measured voltage is measured at a first time when all of the upper semiconductor switches are switched on, and the second measured voltage is measured at a second time when all of the lower semiconductor switches are switched on.

4. The method of claim 3, wherein the first time and the second time are within the same period of the pulses.

5. The method of claim 3, wherein the second time is in a different period of the pulses to the first time.

6. The method of claim 1, wherein the predetermined voltage is controlled as a function of the temperature of the semiconductor switches.

7. The method of claim 1, further comprising the step of switching off the power output stage when the power output stage or the output of the at least one half bridge is identified as being faulty.

8. The method of claim 1, wherein the step of identifying comprises identifying one of the power output stage and the output of the at least one half bridge is faulty when the difference and the second measured voltage are each greater than the predetermined voltage.

* * * * *